Figure 1:
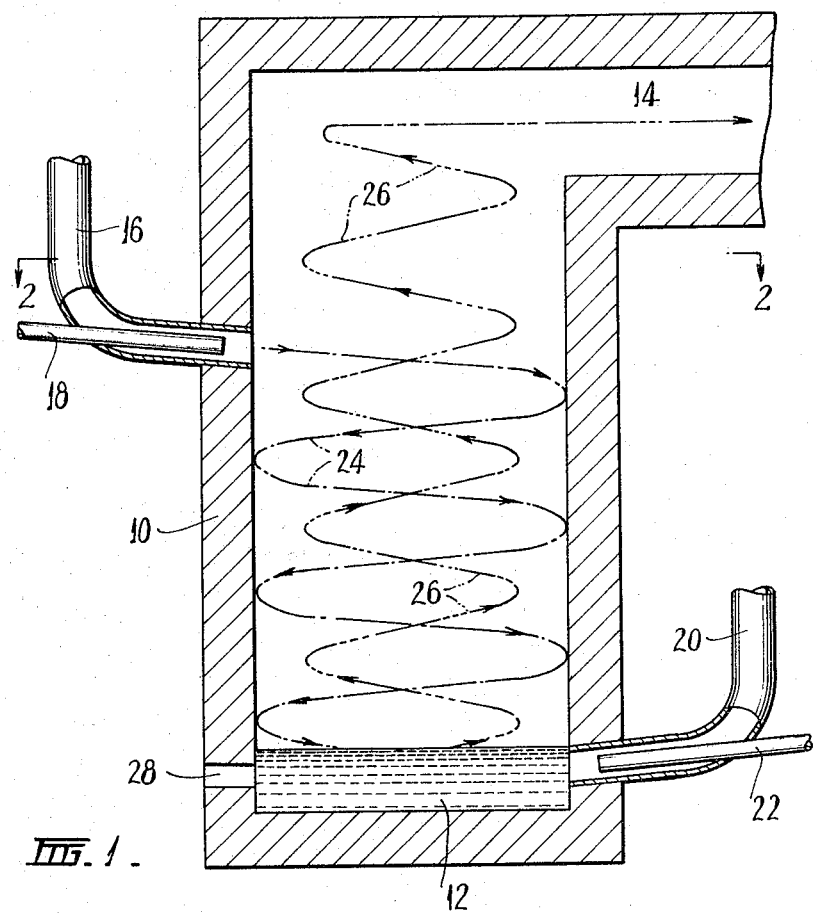

United States Patent Office 3,300,300
Patented Jan. 24, 1967

3,300,300
METHOD FOR THE TREATMENT OF ZINCIFEROUS METALLURGICAL SLAGS AND APPARATUS THEREFOR
Ronald Francis Blanks and Donald Reginald Blaskett, Port Pirie, South Australia, Australia, assignors to The Broken Hill Associated Smelters Proprietary Limited, Victoria, Australia, a corporation of Australia
Filed Nov. 7, 1963, Ser. No. 322,116
Claims priority, application Australia, Nov. 13, 1962, 24,227/62
5 Claims. (Cl. 75—77)

This invention relates to the separation of zinc by reduction and volatilization from zinciferous metallurgical slags and has been devised particularly for, but is not limited to, the separation of zinc from lead blast furnace slag.

Various methods have been used or proposed for the separation of zinc from the slag produced in lead blast furnaces when the ore contains zinc, and it is an object of this invention to provide an improved process for this and for other purposes.

Another object is to provide improved apparatus in which the said process may be carried out.

The invention includes the method of separating zinc by reduction and volatilization, from zinciferous metallurgical slags, comprising continuously directing secondary combustion air and discrete zinciferous slag into an intermediate part in the height of a substantially vertical and generally cylindrical chamber in a manner such that said slag descends in the chamber while whirling in contact with the wall thereof, continuously supplying fuel and primary combustion air to and igniting the same in a lower part of the chamber and discharging the burnt gases from the upper end thereof, whereby said slag is progressively heated and melted as it descends in counterflow to the burnt and burning gases, and maintaining a reducing zone within the lower part of the chamber by supplying said primary air at a rate which is insufficient for the complete combustion of the fuel, whereby zinc oxide in said slag is reduced and zinc is volatilized in said zone, and the amount of said secondary air being sufficient to complete the combustion of the fuel and to maintain an oxidizing zone within the upper part of the chamber.

A pool of the molten slag is preferably maintained in the bottom of the chamber and the fuel, preferably a finely divided carbonaceous fuel such as pulverized coal, is preferably blown tangentially into the pool.

The invention also includes a metallurgical furnace for use in carrying out the said method, comprising a substantially vertical and generally cylindrical chamber adapted to hold a pool of molten slag in the bottom thereof, means for directing discrete slag and secondary combustion air substantially tangentially and with a downward inclination into the chamber at an intermediate level in the height thereof, whereby said slag descends within the chamber while whirling in contact with the wall thereof, means forming a passage which communicates with the upper end portion of the chamber for the discharge of burnt gases therefrom, means for continuously supplying fuel and primary combustion air substantially tangentially into the lower end portion of the chamber whereby a strongly reducing zone is maintained in the lower part of the chamber and an oxidizing zone is maintained in the upper part thereof whereby the combustion of the fuel is completed within the upper part of the chamber.

Figure 2:
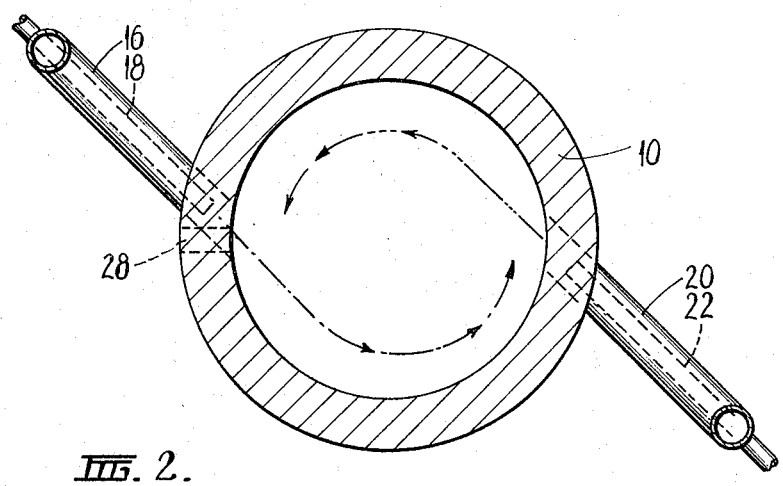

An example of the invention is hereinafter described with reference to the accompanying drawings in which:

FIGURE 1 is a view in sectional elevation of a cyclone furnace according to the invention, and FIGURE 2 is a view in sectional plan taken on the line 2—2 of FIGURE 1.

The illustrated furnace 10 is of vertical cylindrical form and is formed of or lined with refractory material and the closed bottom thereof forms a hearth for a bath 12 of the molten material produced in the operation of the furnace. The furnace wall may be water-cooled, if required.

A discharge passage 14 for the gaseous combustion products and entrained volatilised metal or metal compound communicates laterally with the upper end of the furnace and this passage may communicate with a collection device (not shown) of any appropriate type.

An air pipe communicates approximately tangentially with the interior of the furnace through a water-cooled tuyere (not shown) some distance below the discharge passage 14, this pipe being downwardly inclined at a small angle when viewed in side elevation as in FIGURE 1. A pipe 18 for the supply of granular or other discrete treatment material extends axially into the discharge end portion of the air supply pipe 16. If desired, the pipes 16 and 18 may communicate independently with the interior of the furnace, in which case, they are preferably arranged so that their axes intersect within the furnace so that the air and treatment material are effectively mixed therein.

A second downwardly and inwardly inclined air pipe 20 communicates approximately tangentially with the interior of the furnace also through a water-cooled tuyere (not shown) and preferably below the surface of the bath 12 of molten material, the arrangement of this air pipe being such that the air thus introduced rotates within the furnace in the same direction as that supplied through the upper air pipe 16 as shown by the arrows in FIGURE 2.

A pipe 22 for the supply of finely divided coal extends axially into the discharge end portion of the air pipe 20 and terminates short of the interior of the furnace to permit of adequate intermixture of the fuel and air before it enters the latter or, alternatively, these pipes also may be arranged so that intermixture takes place within the furnace.

The results set out in the following example of the invention were obtained with a small experimental furnace as shown in the drawings and having an internal diameter of twelve inches.

EXAMPLE

*Extraction of zinc from lead blast furnace slag*

Granulated slag screened to minus one-eighth of an inch mesh and having the following percentage composition was treated in the furnace for the extraction of zinc therefrom:

| | Weight percent |
|---|---|
| FeO | 30.0 |
| $SiO_2$ | 19.5 |
| CaO | 13.5 |
| ZnO | 23.0 |
| $Al_2O_3$ | 6.8 |
| MnO | 1.9 |
| Pb | 1.8 |
| S | 1.4 |
| MgO | 0.8 |

The granulated slag, together with a small proportion of air were supplied to the furnace through the feed pipe 18 while additional preheated secondary combustion air was supplied at a sufficiently high velocity through the upper air pipe 16. The air-slag mixture thus projected tangentially with a downward inclination into the upper part of the furnace through the upper tuyere was thus caused to swirl around the interior of the furnace in a descending helical path indicated diagrammatically by the broken line 24 in FIGURE 1.

A bath 12 of molten residual slag was maintained in the bottom of the furnace and pulverised coal and air was continuously projected tangentially into this bath through the feed pipe 22 and the lower tuyere together with preheated primary combustion air supplied through the pipe 20.

The bath 12 was thus maintained in a state of violent agitation and the gaseous combustion products passed upwardly through the central part of the furnace in an ascending helical path diagrammatically indicated by broken lines at 26 in FIGURE 1. Thus, these gases moved upwardly within and in contact with the descending swirling layer of slag which rotated in the same direction.

The air injected into the bath through the lower tuyere with the pulverised coal was insufficient for the combustion of the latter to $CO_2$ while the secondary air supplied to the furnace through the upper tuyere with the slag was approximately sufficient to complete the combustion of the fuel.

The gases in the furnace were thus strongly reducing within, immediately above, and close to the bath 12 and were progressively less strongly reducing as they approached the discharge passage 14. In one typical run, the gases at the bottom of the furnace contained:

| | Percent |
|---|---|
| CO | 19–20 |
| $CO_2$ | 1–3 |
| $O_2$ | Less than 0.2 | while the gases in the discharge passage 14 had a temperature of about 1350° C. and contained:

| | |
|---|---|
| $CO_2$ | High percentages. |
| CO | Less than 0.2%. |
| $O_2$ | Up to 2%. |

The temperature within the upper part of the furnace was such that the incoming slag was flash melted. Reduction of the zinc compounds took place close to or within the molten bath, the zinc vapour being re-oxidised as it passed upwards through the furnace towards and through the discharge passage 14.

Molten residual slag was continuously or intermittently discharged from the furnace through a tap hole 28 while the zinc fume or vapour carried off with the gases may be collected.

The percentage recovery of zinc was found indirectly by assays of the residual slag, the ZnO content of which varied from about 4.8% to about 9% with different feed rates of slag and different proportions of coal to slag. The optimum feed rate of the slag for satisfactory zinc recoveries appeared to be of the order of five pounds per minute using about twenty-five pounds of coal per one hundred pounds of slag, the zinc oxide content of the residual slag being then about 7%–8% by weight.

The residues from the production of electrolytic zinc when admixed with silica sand and preferably after agglomeration into bodies of a suitable size may be similarly treated for the extraction of zinc therefrom.

Factors which were found to contribute significantly to optimum results were:

(1) Finely divided coal.
(2) Injection of the mixture of coal and primary air into the bath of molten slag.
(3) A ratio of furnace diameter to vertical distance between the tuyeres of about 1:1.5, though the optimum ratio would probably be different with a furnace of larger diameter.
(4) Highly preheated air.

The invention is applicable also to the treatment of many other metalliferous materials including lead sinter containing zinc from which zinc oxide may be separated as fume leaving molten lead bullion and slag, and sulphide ores or concentrates, such as chalcopyrite, from which sulphur may be removed as sulphur dioxide with the simultaneous formation of an enriched molten phase.

We claim:

1. The method of separating zinc, by reduction and volatilization from zinciferous metallurgical slags which comprises continuously directing secondary combustion air and discrete zinciferous slag into an intermediate part in the height of a substantially vertical and generally cylindrical chamber in such a manner that said slag descends in the chamber while whirling in contact with or adjacent to the inner surface of the wall thereof; continuously supplying fuel and primary combustion air to and igniting same in a lower part of said chamber and discharging the burnt gases from the upper end thereof, whereby said slag is progressively heated and melted as it descends in counter flow to the burnt and burning gases; and maintaining a reducing zone within the lower part of said chamber by supplying said primary air at a rate which is insufficient for the complete combustion of the fuel, whereby a reducing zone is maintained in the lower part of the chamber, reducing the zinc compounds in the slag in said reducing zone, and volatilizing the zinc metal, and wherein the amount of said secondary air is sufficient to complete the combustion of the fuel, and to maintain an oxidizing zone, within the upper part of the chamber.

2. The method according to claim 1 wherein a pool of said molten slag is maintained in the bottom of said chamber.

3. The method according to claim 1 comprising maintaining a pool of said molten slag in the bottom of said chamber and projecting said fuel and primary air into said pool.

4. The method according to claim 1 wherein said slag is granulated lead blast furnace slag.

5. A metallurgical furnace for the separation, of zinc, by reduction and volatilization from zinciferous metallurgical slags which comprises a substantially vertical and generally cylindrical chamber adapted to hold a bath of molten slag in the bottom thereof;
means for directing discrete slag and secondary combustion air substantially tangentially and with a downward inclination into the chamber at an intermediate level in the height thereof, whereby said slag descends within the chamber while whirling in contact with or adjacent to the inner surface of the wall thereof;
means forming a passage communicating with the upper end portion of the chamber for the discharge of burnt gases therefrom; and
means for continuously supplying fuel and primary combustion air substantially tangentially into the lower end portion of the bottom part of the chamber close to the surface of the bath.

References Cited by the Examiner

UNITED STATES PATENTS

| 1,759,559 | 5/1930 | Job | 75—87 X |
| 1,799,643 | 4/1931 | Rogers | 266—11 X |
| 1,993,972 | 3/1935 | Marx | 266—11 |
| 2,530,078 | 11/1950 | Ramsing | 266—33 |
| 2,795,500 | 6/1957 | McIntosh | 75—87 |
| 2,973,260 | 2/1961 | Nogiwa | 266—24 X |

DAVID L. RECK, *Primary Examiner.*

H. W. TARRING, *Assistant Examiner.*